(12) United States Patent
Golitsin et al.

(10) Patent No.: US 8,275,111 B2
(45) Date of Patent: Sep. 25, 2012

(54) METHOD AND APPARATUS FOR MULTIMEDIA INTERACTION ROUTING ACCORDING TO AGENT CAPACITY SETS

(75) Inventors: Vladimir G. Golitsin, San Jose, CA (US); Vitaly Y. Barinov, Walnut Creek, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 1079 days.

(21) Appl. No.: 12/175,764

(22) Filed: Jul. 18, 2008

(65) Prior Publication Data

US 2008/0285739 A1 Nov. 20, 2008

Related U.S. Application Data

(63) Continuation of application No. 10/337,489, filed on Jan. 6, 2003, now Pat. No. 7,418,094.

(51) Int. Cl.
*H04M 7/00* (2006.01)
(52) U.S. Cl. .............. 379/220.01; 379/221.14; 379/234; 379/219
(58) Field of Classification Search ............. 379/220.01, 379/221.14, 234, 219
See application file for complete search history.

(56) References Cited

U.S. PATENT DOCUMENTS

| | | | |
|---|---|---|---|
| 6,560,329 B1 * | 5/2003 | Draginich et al. | 379/265.02 |
| 7,092,509 B1 * | 8/2006 | Mears et al. | 379/266.01 |
| 2001/0024497 A1 * | 9/2001 | Campbell et al. | 379/265.09 |

* cited by examiner

*Primary Examiner* — Quynh Nguyen
(74) *Attorney, Agent, or Firm* — Donald R. Boys; Central Coast Patent Agency, Inc.

(57) ABSTRACT

A routing software application for predicting a best routing destination from a pool of considered routing destinations for an incoming event into a communications routing system has a detection module for detecting the arrival of the event for routing;

at least one instance of an information gathering routine for gathering and compiling information about the considered destinations; at least one reporting module for organizing and reporting the gathered information; and a processing module for computing values from the gathered information and selecting the best routing destination based on isolation of the best computed value. In a preferred embodiment scalar load information per media type and per destination and agent skill information related to at least media skills per type of media per destination is processed by the processing module, which isolates, identifies, and selects at least the best destination for routing.

16 Claims, 3 Drawing Sheets

METHOD AND APPARATUS FOR MULTIMEDIA INTERACTION ROUTING ACCORDING TO AGENT CAPACITY SETS

CROSS-REFERENCE TO RELATED DOCUMENTS

The present invention is a Continuation of U.S. application Ser. No. 10/337,489, filed on Jan. 6, 2003, now U.S. Pat. No. 7,418,094 which is related to a U.S. Pat. No. 6,263,066, which issued on Jul. 17, 2001. Disclosure from prior applications are incorporated herein at least by reference.

BACKGROUND OF THE INVENTION

1. Field of the Invention

The present invention is in the field of multimedia communications and interaction routing software and pertains particularly to methods and apparatus for routing multimedia events to communication-center agents based on agent capacity sets in real time.

2. Discussion of the State of the Art

Telephones are one of the most widely used communication tools in the world. At first, telephones were merely a convenient tool to allow people to communicate while they were physically separated. More recently, however, many companies use telephones to market products and services, provide technical support to customers, allow customers to access their own financial data, and so forth.

In order to more effectively use telephones for business and marketing purposes, call centers have been developed. In a call center, a relatively large number of agents handle telephone communication with clients. The matching of calls between clients and agents is typically performed by software. A simple example is used here to describe a few of the many advantages of using call centers. When a call is made to a call center, the telephone number of the calling line is typically made available to the call center by a telephone carrier. Based on this telephone number, the software in the call center can access a database to obtain information about the client who has that phone number. The software can then better route the call to an agent who can best handle the call based on predefined criteria (e.g., language skill, knowledge of products the customer bought, etc.). The software also immediately transfers relevant information about the client to a computer screen used by the agent. Thus, the agent can gain valuable information about the customer prior to receiving the call. As a result, the agent can more effectively handle the telephone transaction.

It can be seen from the above example that the enabling technology requires a combination of telephone switching and computer information processing technologies. The term commonly used in the art for this combined technology is computer-telephony-integration (CTI).

In recent years, advances in computer technology, telephony equipment, and infrastructure have provided many opportunities for improving telephone service. Similarly, development of the information and data network known as Internet, together with advances in computer hardware and software have led to a new multimedia telephone system which will be referred to herein as data-network-telephony (DNT) which encompasses all multimedia-based communication including Internet Protocol Network Telephony (IPNT). IPNT is a special case of Data Network Telephony (DNT) wherein telephone calls are computer-simulated, and audio data is transmitted in the form of data packets.

In DNT systems as well as in the older intelligent and CTI-enhanced telephony systems, both privately and publicly-switched, it is desirable to handle more calls faster and to provide improved service in every way. This desire applies to multimedia-based communications in addition to telephone calls, as some call centers have moved to combine DNT with CTI technologies. It is emphasized that computer-simulated calls attributed to DNT may be made over company Intranets and other sorts of data networks as well as the Internet. The Internet is primarily used an as an example in this specification because it is broad and pervasive with universal protocol.

One of the major goals of any call center is to maximize client satisfaction. Part of the satisfaction that a client might receive from doing business with a company relates to how quickly and efficiently he or she is served. For example, when a client calls in to place an order for a product or service, he or she does not want to be put on hold for a lengthy period of time.

If a client sends an E-mail, Voice mail or another type of multimedia communication, he or she does not want to be overlooked or forgotten on an agent's computer. Rather, the client desires that a timely and professional response will be sent back by the company. This is especially true with company-to-company buying of products or services. A typical buyer has many duties that can be interrupted because of inordinate amounts of time spent waiting to place an order. In these types of situations, idle time costs money, and in many cases, cannot be tolerated. Many orders are lost by companies who have put clients in long waiting queues or subjected them to long waiting periods for multimedia responses. Such clients often become annoyed, perhaps searching for a suitable competitor who can meet their needs in a timely manner.

With call centers evolving into sophisticated and fast-paced contact centers wherein telephone and multimedia communications are routine, it becomes desirable to be able to prioritize and intelligently route all forms of communication with the goal of expedient and professional service to the client in mind.

Intelligent routing rules put in place in some intelligent networks known to the inventors have provided some relief for callers who would be stuck in queue much longer without them. For example, in some intelligent networks known to the inventor, skill-based routing, predictive routing, routing based on agent availability, as well as other intelligent implementations have provided for a better use of agent time within a call-center environment, thereby shortening queue length and reducing waiting time. However, even with these developments, there are certain peak periods during call-center operation that long waiting queues are unavoidable. Also, intelligent routing rules, such as predictive routing or routing based on skill set of the agent are somewhat limited in current art to conventional telephone apparatus and calls, which are termed in this specification Connection-Orientated Switched Telephony (COST) calls.

Another problem in the current art involves separation of different protocols that are associated with different communication forms. Intelligent routing must typically be separately implemented for each communication method that uses a separate protocol. For example, an E-mail routing system would typically be separate from a COST call routing system, and so on. No viable solutions have been offered in current art that would integrate and combine functions of a routing system in order to provide priority and skill based routing for COST calls as well as DNT calls including multimedia communications.

The inventor is aware of a queuing system for a contact center wherein the system is adapted to queue voice mails as well as live telephone calls. In a preferred embodiment the calls include both connection-oriented switched telephony (COST) calls and Data Network Telephony (DNT) calls. Callers are enabled to leave voice mail as an alternative to waiting, and records of the voice mails are queued, preferably in the same queue processing the live calls. In some embodiments the call center is enabled to process e-mails, video mails and facsimile messages as well as live calls and voice mail messages, and all types of multimedia communication can be queued in the same queue according to pre-stored routing rules and priority rules.

Skill-based intelligent routing as used in communication-center routing schemes has long been associated on a per-media basis and connected to more basic routing intelligence such as routing based on real-time availability or even predicted availability. In other words, when a customer calls in, first an available agent is found that meets a certain pre-set skill value in terms of possessing a certain type of specialized skill required of the caller. For example, if a Spanish-speaking customer is looking for assistance, the agent selected would have to possess the basic skills required to service the interests of the caller and the particular skill of speaking Spanish. Skills then are largely pre-set values that are quantified and qualified for agents before creating intelligent routing routines that utilize the values in routing. Skill predeterminations for agents working in a communications center environment are limited to real-value skills like the ability to speak Spanish, the ability to process certain documents, knowledge in certain areas of business function, access to certain external data sources, and so on.

Availability routing routines are based on the availability of an agent in real-time and can be discerned in real-time during execution of an intelligent routine. The inventor knows of predictive agent-availability routines that can predict a probability factor of whether or not a particular agent or group of agents will be available at a certain point in time. Predictive routines eliminate some of the steps required of real agent-availability routines and therefore streamline the routing process even if they are somewhat less reliable in producing an available agent for a caller waiting in queue.

Agent availability routines, unlike traditional load-balancing routines, are particular to agents' media responsibilities as practiced at their stations for agent-level-routing (ALR). In a multimedia-capable contact center for example, any one agent may be responsible for several communications mediums like telephone, e-mail, voice mail, Internet telephony, Fax, file transfers, and so on. Unlike determining agent loads at switches, shared queues, and other major routing points, agent availability based on media is concerned with the ongoing local tasks of an agent who may be handling several communications mediums simultaneously at his or her station.

One way to determine agent availability for routing is to monitor the agent meticulously, such as by requiring the agent to log in and out of communications tasks and/or assigning specific tasks for specific periods. For example, when an agent is logged in answering e-mail, he or she is somewhat less available for answering other mediums of communications like COST telephone, or file transfers. Some agents may be determined to be unavailable for all other mediums if a telephony queue reaches a certain threshold. Therefore, it can be seen that modern agent-availability values are largely scalar in nature and based on current queue loads and real-time agent scheduling. Typically, from the caller's viewpoint, an agent is determined to be busy or not busy. Aside from strict management of what mediums an agent is allowed to work with at any given period, predicting the true availability of an agent across multiple mediums is not practiced.

It has occurred to the inventors that multimedia queue capabilities and event prioritization as taught in the related case U.S. Pat. No. 6,263,066 listed above can be enhanced with local knowledge of agent interaction or communication systems status and communications-medium-based agent skill assessments to produce an intelligent routing routine that incorporates both skills and availability factors across multiple mediums.

Therefore, what is clearly needed is a method of intelligent routing that computes real-time agent availability across multiple communications mediums wherein the computed value also accounts for agent up-to-date skill levels in handling the mediums encountered. Such a method would provide a predictive routine that would further streamline multimedia queues and result in faster event processing and customer satisfaction.

SUMMARY OF THE INVENTION

In a preferred embodiment of the present invention a routing software application for predicting a best routing destination from a pool of considered routing destinations for an incoming event into a communications routing system is provided, comprising a detection module for detecting the arrival of the event for routing, at least one instance of an information gathering routine for gathering and compiling information about the considered destinations, at least one reporting module for organizing and reporting the gathered information, and a processing module for computing values from the gathered information and selecting the best routing destination based on isolation of the best computed value. The application is characterized in that scalar load information per media type and per destination and agent skill information related to at least media skills per type of media per destination is processed by the processing module, which isolates, identifies, and selects at least the best destination for routing the event.

In one embodiment the destinations are associated with a pool of agents in a communications center, the agents assigned to and operating more than one type of multimedia application for serving incoming events. Also in an embodiment the destinations are agent-operated multimedia workstations. In yet another embodiment the incoming events for routing include telephone calls, e-mails, voice mails, file share requests, IP telephony calls, video conference calls, instant message sessions, and chat sessions. In still another embodiment the processing module is part of a CTI processor hosting the software application. In some cases the CTI-processor has connection to one or a combination of a telephony switch, a second CTI processor, and an IP router.

In yet another embodiment of the invention the processing module uses an algorithm to determine a best match destination for an incoming event for routing, the algorithm producing a predictive result based on scalar load values per media type utilized simultaneously at a destination at a given period of time of the executed routing routine request and agent skill values per media type assigned. In still another embodiment the at least one instance of information gathering routine is executed from at least one instance of reporting module, the reporting module a distributed client of the application. The number of the at least one reporting module may be equal to the number of considered destinations for routing, the modules distributed to the destinations and permanently resident therein.

In still another embodiment scalar load information includes queue load per media type per agent, server loads related to multimedia servers, port loads related to agent-operated communication ports, line loads related to network routing paths leading to agents, and system loads relating to number of applications running and memory-use of those applications on agent-operated systems. In some cases the agent-operated systems include desktop computers.

In another aspect of the invention a method for routing specific incoming interaction events of varying multi-media types to specific agents operating in a pool of agents in a contact center, the agents in the pool of agents operating more than one application for handling the interactions of the multi-media types comprising steps of (a) detecting an incoming interaction event and identifying at least the media type of the event, and purpose of the event; (b) constructing an agent capacity set of all of the considered agents in the pool of agents; (c) isolating at least one available agent from the considered agents based on determination of least relative load in comparison with all of the agents relative load values defined in step (b); and (d) routing the interaction to the agent having the lowest value of relative load.

In some embodiments of the method, in step (a), the incoming interaction events for routing include telephone calls, e-mails, voice mails, file share requests, IP telephony calls, video conference calls, instant message sessions, and chat sessions. Also in some embodiments, in step (b), the agents are operating computerized agent workstations, the agent capacity set comprising a list of all of the agent's individual capacities identified for each agent. In some embodiments, in step (b), the agent capacity set includes load values per media type currently running, system load values, and agent skill-level values related to individual media type.

In some embodiments, in step (c), the least relative load value is derived from scalar load values and skill-level values. Also in some embodiments, in step (c), one available agent is selected and one backup agent is selected. In still other embodiments, in step (c), all agents in the pool of considered agents are automatically considered available agents.

DESCRIPTION OF THE PREFERRED EMBODIMENTS

Figure 1:
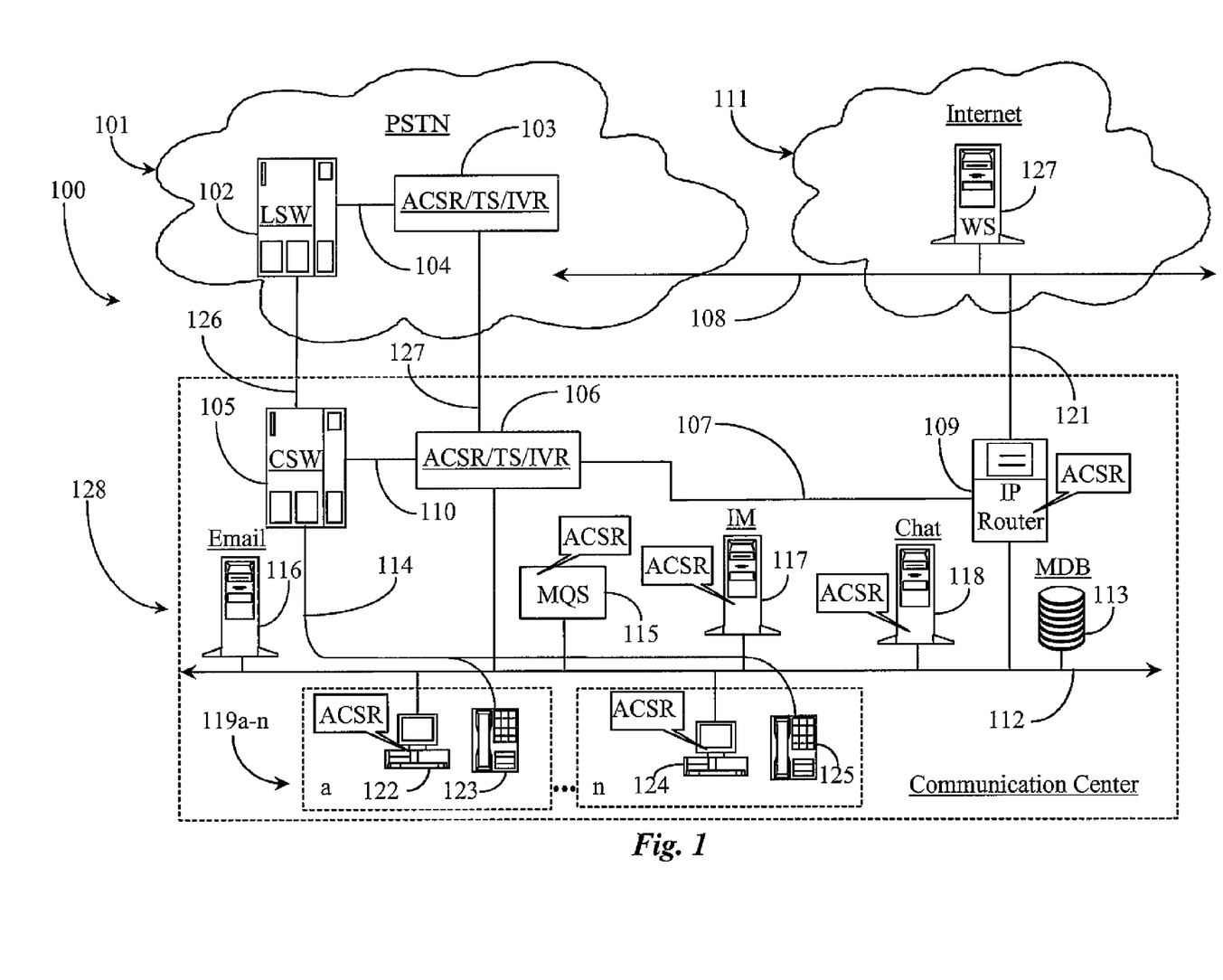
FIG. 1 is an architectural overview of a multimedia communications center using agent-capacity-set-routing (ACSR) according to an embodiment of the invention.

FIG. 1 is an architectural overview 100 of a multimedia communications center 128 using agent-capacity-set-routing (ACSR) according to an embodiment of the invention. Communications architecture 100 includes but is not limited to a telephony network (PSTN) 101, a data-packet-network (DPN) (Internet) 111, and contact center 128.

PSTN network 101 may be any other type of telephony network including private and wireless networks. Internet 111 may be another type of DPN such as a wide-area-network (WAN), an Intranet, an Ethernet, any of which may be corporate, publicly accessible, or private. The inventor chooses the well-known PSTN and Internet networks for this example because of the high public access characteristics and unlimited geographic range statistics.

Contact center 128 receives events from both PSTN 101 and from Internet 111. PSTN 101 may be assumed to contain all of the necessary equipment, for example, telephony switches, routers, carrier switches, network gateways, service control points, and any other equipment required to enable telephony. A local telephony switch LSW 102 is illustrated PSTN 101 and is adapted in this case as a telephony switch local to contact center 128. That is to say that LSW 102 represents a last telephony switch through which calls destined for center 128 are routed. LSW 102 has a telephony connection to a central telephony switch (CSW) 105 provided within center 128. LSW 102 and CSW 105 may be private branch exchange (PBX)-type switches, automated call distribution switches ACDs) or any other type of suitable telephony switches LSW 102 represents a last routing point in the PSTN for calls destined to center 128 and CSW 105 represents a last routing point for all calls before agent level routing.

A computer-telephony-integration (CTI) processor 103 is provided within PSTN 101 and has connection to LSW 102 by way of a CTI link 104. Processor 103 provides intelligent routing and other routines to LSW 102 that are controlled from within center 128. Another CTI processor 106 is illustrated within the domain of contact center 128 and has connection by way of a CTI-link 110 to CSW 105. Processor 106 provides intelligent routing routines to CSW 105. There does not have to be 2 processors (103, 106) connected to enable practice of the present invention. The inventor logically illustrated 2 separate processors for separation of function only.

Processor 103 is illustrated as having a data network connection 127 to processor 106. Connection 127 enables the 2 processors to communicate with each other passing appropriate routines, system updates, routing instruction, voice application instructions. Processor 103 has an instance of transaction server (TS) software, an instance of interactive voice response (IVR) software, and an instance of agent capacity-set routing (ACSR) software installed and executable therein according to a preferred embodiment of the present invention.

Processor 106 located within center 128 has identical instances of software installed therein and executable thereon. The functionality of the processors may be provided in one or the other of the illustrated processors without departing from the spirit and scope of the present invention. The inventor logically illustrates that functionality provided by ACSR/TS/IVR software may be extended into PSTN 101 through switch enhancement, namely CTI processor 103. In this case intelligent routines can be executed at both switches 102 and 105.

TS provides intelligent routing routines such as ones described with reference to the background section of this specification. IVR provides voice interaction functions between center 128 and clients or customers. Both TS and IVR functions are state-of-art routing and interaction programs known to the inventor. The novel function of ACSR software is described later in this specification.

All connection-oriented-switched-telephony (COST) events destined for center 128 are processed for routing information at LSW 102 in some embodiments. In other embodiments routing intelligence extends only to CSW 105, which would then be the processing point for all COST events arriving into center 128. In still another embodiment, processing may be shared between CTI-enhanced LSW 102 and CTI-enhanced CSW 105.

Internet 111 may be assumed to contain all of the lines, equipment and connection points making up the Internet network as a whole. This assumption is represented herein by an Internet backbone 108 extending through cloud 111 in both directions. In actual practice, the boundaries between the PSTN network and the Internet network are defined more by data type carried instead of separate lines. Many shared lines and equipment groups handle both Internet and COST traffic. A Web server (WS) 127 is illustrated within Internet 111 and has connection to backbone 108. WS 127 is adapted as a contact server for clients or customers of center 128 that are using data-network-telephony DNT applications adapted to be used over the Internet network as a data carrier. WS 127 serves electronic information pages as well as provides interactive options for contact such as e-mail, voice mail, Internet Protocol Telephony (IPT), links to other communications servers, access to file sharing software, upload/download functions and so on. Users accessing WS 127 for interaction with center 128 would gain access through normal Internet access and navigation protocols known in the art.

Data sent to center 128 by users through connection to WS 127 travels over an Internet access line 121 connected to an Internet Protocol (IP) router 109 illustrated within center 128. Data sent to users from center 128 travels back over the same connection from router 109. In other embodiment other servers may be involved and direct connections may also be established between users and IP router 109 without departing from the spirit and scope of the present invention. Connection 121 is meant to be logical only.

IP router 109 is an intelligent router that has a direct dataline connection 107 to CTI processor 106 within center 128. Connection 107 enables information and intelligent routines to be distributed to and executed at both system locations (106, 109). Intelligent routines and information may also be uploaded to WS 127 through IP router 109 over connection 121.

Communications center 128 has a local-area-network (LAN) 112 established therein for the purpose of routing notification events, data, and sharing of functionality and software updates between LAN connected stations, systems, and servers. LAN 112 is presumed in this example to be TCP/IP enabled for communication with the Internet and therefore may be thought of as a sub-net of the Internet network. As a sub-net of Internet 111, LAN 112 may be active for Internet communication on a 24-hour basis. LAN 112 has a plurality of WEB-based communications servers connected thereto. These are an e-mail server 116, an instant message server 117, and a chat server 118. Server 116 is adapted to distribute e-mail and voice mail messages received from users accessing through Internet 111 to center recipients or to a general multimedia queue illustrated herein as a multimedia queue system (MQS) 115. MQS 115 is illustrated herein as connected to LAN 112 and is accessible for shared use. Server 116 is also adapted for sending messages out through IP router 109 to Internet-based recipients. Internet based-recipients also include those accessing the Internet through a wireless gateway for Internet capable wireless devices.

IM server 117 is adapted to serve instant messages in real time back and forth between center agents and, in some cases, automated systems, and Internet-based users. Chat server 118 is adapted as a communications server for connection available center personal to ongoing chat sessions hosted by center 128 and held in server 118.

In one embodiment, servers 116, 117, and 118 may be maintained at the level of network 111 instead of in the local LAN domain of center 128. However, for the purpose of the present invention, it is preferred that the just-mentioned servers be held locally or within direct control of center 128. LAN 112 has connection to a multimedia database (MDB) 113. MDB 113 is adapted to store all multimedia interaction history that occurs in the normal communications process carried on by center 128 or agents thereof.

A plurality of agent workstations 119$a$-$n$ is illustrated within communications center 128. Each agent station 119$a$-$n$ has a LAN connection through installed computer systems each supporting a graphical user interface (GUI). Generally speaking, each station 119$a$-$n$ uses a desktop computer with a monitor for GUI display. For example, station 119 has a desktop computer 122 illustrated therein having connection to LAN 112. Station 119$n$ has a desktop computer 124 illustrated therein having connection to LAN 112. Each station 119$a$-$n$ also has a COST telephone disposed therein. Station 119$a$ has telephone 123 and station 119$n$ has a telephone 125. Telephones disposed within stations 119$a$-$n$ such as telephones 123 and 125 have connection to CSW 105 through telephony wiring 114 for normal COST interaction with PSTN-based customers. Contact center 128 is a dual capable center processing both COST events and DPN-based events as illustrated by the specific equipment types and connections. In one embodiment center 128 may be a pure DNT center wherein all COST events arriving thereto are converted to DNT events for computer processing or pick-up through IP-based data phones or headsets/handsets.

One with skill in the art of telephony communications centers will notice that there may be additional servers and system employed within a contact center of the type described that are not illustrated in this example. For example, a customer-information-system (CIS) server, voice-application-server (VAS), a historical database, a statistics server (Stat-server), and others may be included in this example without departing from the spirit and scope of the invention. Furthermore, center 128 may also be an object-oriented system that employs and object database using a communications model, a middleware server, and a legacy-type functional database system. In this embodiment a host of system-to-system processes may be set-up to run in automated fashion. The inventor only illustrates the components most involved with or required to demonstrate various aspects of practicing the present invention.

ACSR software is provided both within center 128 and in distribution to network-level locations. Given the illustrated architecture within center 128, ACSR software is based on processor 106 in this embodiment as a parent application. ACSR software may instead or also be provided as a parent application on processor 103 if agent level routing is performed at the level of switch 102. ACSR software may also be provided as a parent application on IP router 109. ACSR software is adapted to work with existing CTI and TS software applications to predict real-time agent availability for communications with customers across all of the agent's active communications tools and mediums. ACSR software is also adapted to figure into the equation agent skills related to operation of specific tools and mediums used by the agent in interaction. Agent skill weights and agent availability weights are combined to create an agent capacity set that is a dynamic snapshot of an agent's state that is used for routing determination.

Instances of ACSR are illustrated in this example at system locations where agent information is gathered for processing. These instances are, in one embodiment, spawned by the parent application running on processor 106. For example, an instance of ACSR is illustrated in MQS 115, in IM server 117, in Chat server 118, in IP router 109, and on agent computers 122 and 124. In another embodiment, the just-described ACSR instances are permanently installed ACSR plug-in modules adapted to monitor agent activity and communicate the particulars upon request from a parent ACSR application.

It is important to note herein that a parent instance of ACSR may be provided in plural to multiple processing bases if they exist in the architecture. For example, if contact center 128 has several telephony switches and CTI processors adapted in pairs for example to service separate agent groups, then a parent ACSR instance may be provided one instance per equipment pairing, one instance dedicated to one agent group. There are many configuration possibilities.

In practice of the invention, call events routed to switch 105 for example, would be processed by routines provided by processor 106. IVR interaction would typically ensue and internal routing determination processes would launch. If sub-instances of ACSR are spawned from the parent, then they would be distributed in one operation to appropriate points in the system for information gathering. A spawned instance at MQS 115 would report scalar queue information for each agent in a pool of agents sharing MQS 115. This would be accomplished for each media type active in the queue and be reported in a fashion particular to each agent in the group.

Spawned instances distributed from processor 106 may also appear on agent computers as illustrated herein with respect to computers 122 and 124. These instances gather and report agent computer activity like programs running, and map any current interaction activity states occurring per computer per agent in the considered group. ACSR instances in servers 117 and 118 report any agent related activities occurring therein on the level of individual agent. ACSR at IP router 109 would report any queued events waiting for routing or queued for agent treatment on a per-agent basis. In addition to reporting scalar agent-load information in terms of media-type of events waiting for agents being considered as routing destinations, ACSR spawned instances also gauge and report mechanical capacity data related to server-capacities, queue capacities, desktop computer capacities, and line capacities. These capacity values are figured into score values for each considered agent. For example, an agent who has 3 programs running on his computer and is therefore low in computer resources will likely be passed over in routing an Internet Protocol Network Telephony (IPNT) event when other agents have fewer or nor current programs running.

It is noted herein that the actual points of reference for spawned instances of ACSR may vary depending on the type of media of the event waiting for routing determination, and the current media types and assignments of agents considered as potential destinations of the event. In one embodiment there are no spawned instances of ACSR software for gathering agent state information, rather distribute ACSR modules are provided as standalone clients to the parent application or as plug-in client modules that can be adapted to the appropriate instances of application, sever and communications applications used in the communications-center system.

ACSR software running on processor 106 computes all of the returned data by algorithm in a process to determine at least one routing destination recommendation once all of the ACSR client instances have reported. The determination is based on a multidimensional picture of agent activity over multiple mediums and includes skill weighting. The selected best match for the current event is recommended to TS software for routing.

Figure 2:
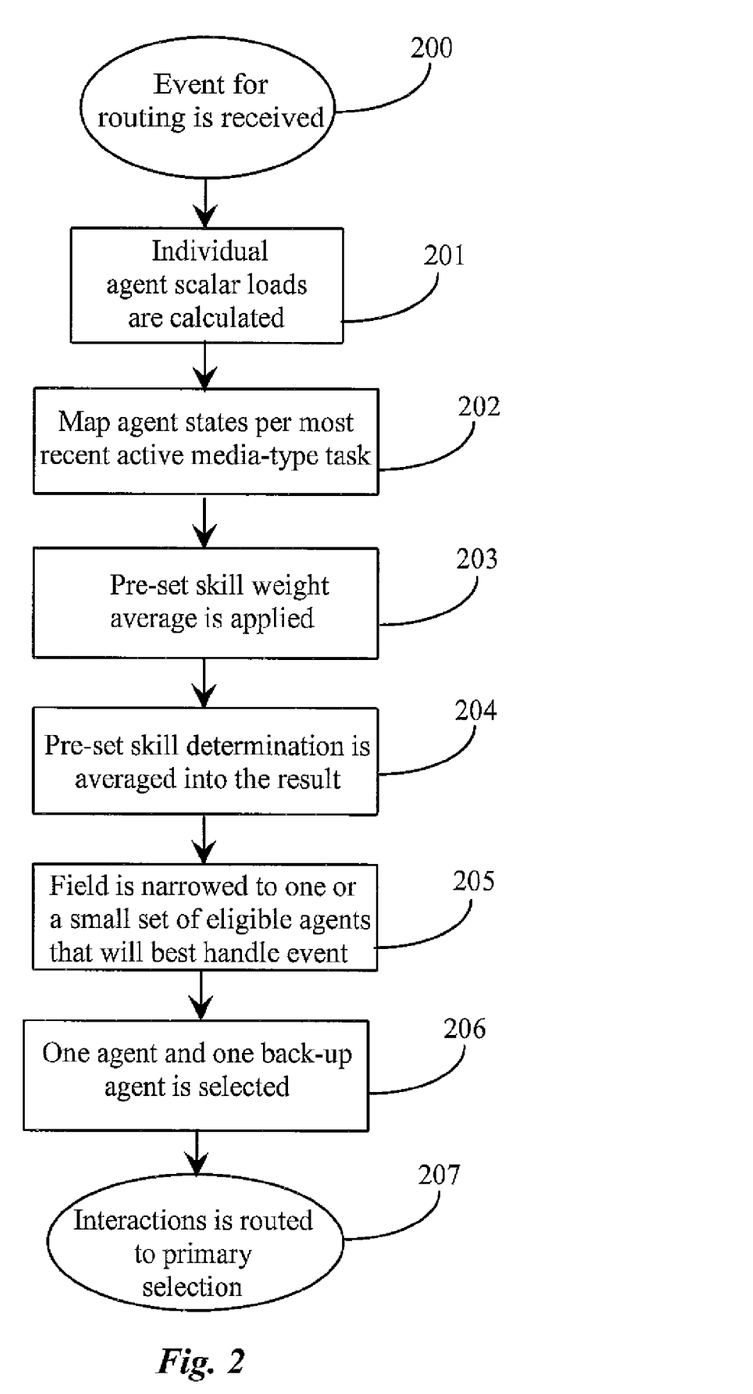
FIG. 2 is a process flow diagram for routing according to ACSR.

FIG. 2 is a process flow diagram for routing according to ACSR. At step 200 an event is received for routing. The event can be any type of center-supported media. At step 201, individual scalar loads on existing agent-based resources are calculated. Scalar loads include indicators of queue depth per media type per agent, server load for agent-led chat sessions, state of programs running on an agent machine, back-up indicators at agent operated data ports, indication of traffic flow or bottle neck over LAN connections, and so on.

At step 202, agent states are mapped according to the most recent media-specific task. There are two linear operators applied to current agent state. The first one maps the agent state N to the agent state N* the agent goes to after being assigned a new media type. The second maps the agent state N to the agent state N* the agent goes to after completely serving an interaction of the new media type. This state information is available for all supported media types and simultaneous agent interactions of those media types. Therefore, each agent has a bounded set of vectors defined as a polytope value used in a main algorithm.

At step 203, pre-set skill weight averages of all of the agents are computed with their state values. Individual skill weights for different media types will vary from agent to agent. These values can be combined to produce an average and dynamic skill weight that reflects a skill level state of an agent using the currently assigned media types. In one embodiment a value reflecting agent product knowledge may also be figured in. This value can also be a pre-set value that is updated periodically as an agent gains more experience. The same is true for skill weights of particular communications mediums. As an agent improves his ability to handle video conferencing software, for example, his skill weight in that particular medium can be upgraded to reflect the increase in skill over a period of time.

At step 204, the skill weights per agent are averaged in with their polytope results and compared. At step 205, the field of possible destinations for the event under scrutiny is narrowed to at least a relatively small set of available agents that could best handle the pending interaction. At step 206 one agent is selected from the group and in a preferred embodiment, a back-up agent is identified. The criteria for narrowing the field down to one destination agent and one backup may depend on media type of the pending interaction. For example, if there are six available agents with the same values in the narrowed field some secondary criteria is used in the selection process. The selection criteria could be a throwback value from initial availability determination and re-compared for the narrowed field. In this way, a better match may be achieved than might be achieved through random selection of equally graded agents. Of course in some embodiments only a single agent may emerge as an obvious selection.

An example of a secondary comparison in the event of need for a tie breaker may simply be to re-evaluate the last active media states of equally-graded agents and choose one that has a media state most suitable for the pending interaction. Enterprise rules can be created and applied to any tie-breaking situations. Random selection from a narrowed field of agents may also be practiced.

At step 207, the pending interaction is routed according to the selection made at step 206. The ACSR software may, in one embodiment, be integrated with TS software to the point of trading operations. Traditional routing rules and standard processes may be used to first narrow a field of agents to some extent before applying the algorithm to the remaining field. Step 207 may, in some cases, be the only step involving TS software. In one embodiment, ACSR software simply forwards the selection result obtained at step 206 as a command to TS software for initiating the routing mechanics for an event that has a destination determined. Any back-up destination can be tagged on to the command as a secondary operation should the first connection fail or suddenly become unavailable.

It will be apparent to one with skill in the art that the process described in this example can be integrated with existing routing protocols and routines generic to transaction server TS software and CTI software. ACSR routines result in a predictive state of the destination unlike standard routines that simply determine that an agent is busy and cannot handle an interaction or that the agent is not busy and can handle the interaction.

ACSR processing determines a best match from a pool of possibilities taking into account multiple active media-type interactions being processed by the agents and skill-level indicators that predict an agent's probable efficiency in taking the new interaction without compromising the quality of the current load the agent is dealing with. ACSR enables a multidimensional view of the agent and therefore provides maximum utilization of the agents' capabilities in a multi-tasking environment such as a multimedia communications center.

Figure 3:
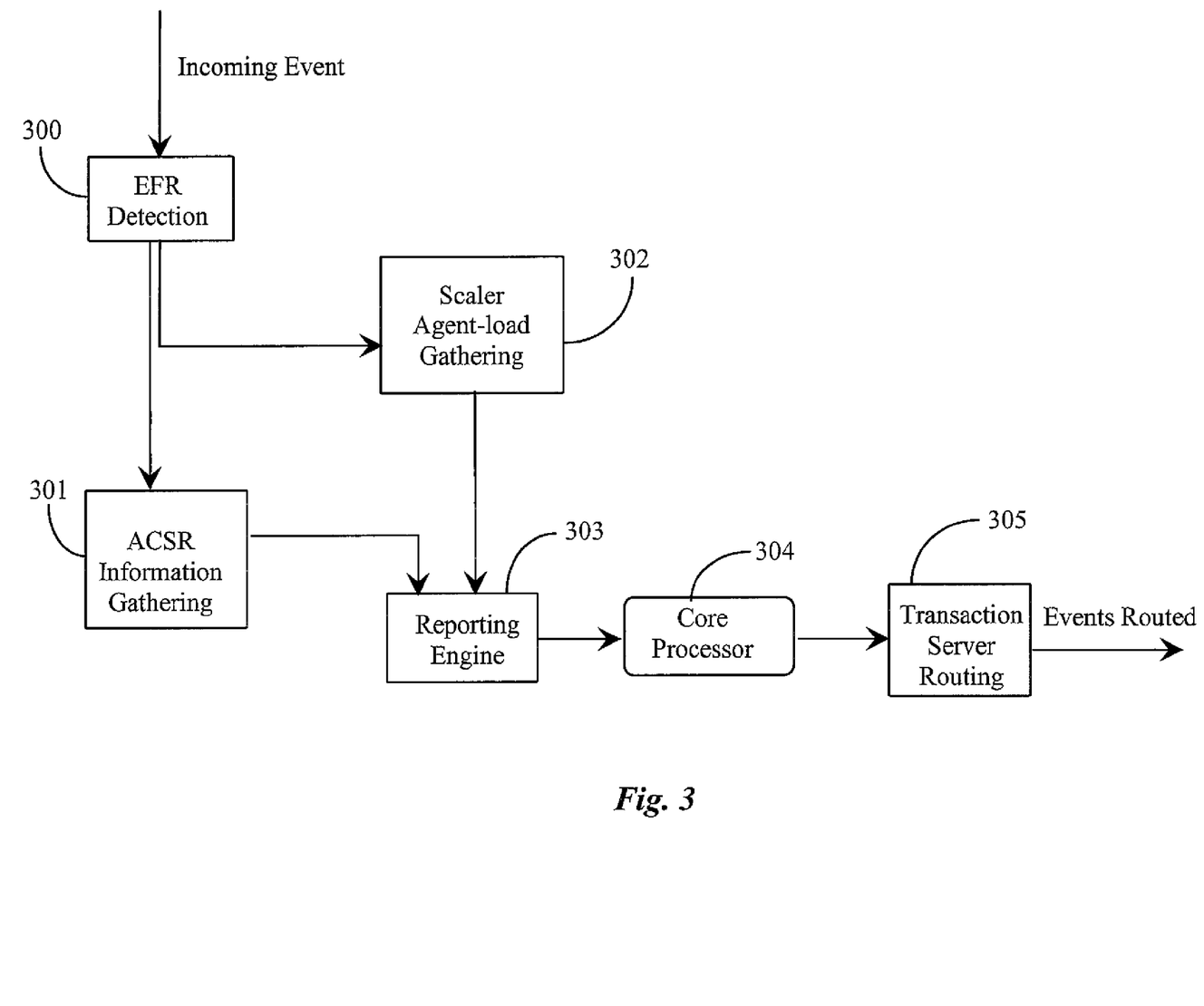
FIG. 3 is a block diagram of various software modules interacting to process Agent Capacity Sets used in weighing agent availability for routing.

FIG. 3 is a block diagram of various software modules interacting to process Agent Capacity Sets used in weighing agent availability for routing. ACSR software is automated and uses an automated detection device to detect events for routing. An event-for-routing (EFR) detection module 300 is provided and adapted to detect all incoming events for routing. This feature can be used to customize ACSR software to a particular group of agents. For example, only one or a few of several available groups of agents can be configured for ACSR routing. In this case the criteria for event detection is tailored to indications that a particular group should handle an event. IVR interaction can provide the trigger or triggers for initiating the process for particular incoming events.

Upon detecting an event for ACSR routing determination, sub-instances of ACSR are spawned in one embodiment. For example, a scalar agent-load gathering instance 302 is spawned to gather the most recent load information. An ACSR information-gathering instance is spawned to gather the most recent state information from the agent-activity. ACSR instances 302 and 301 can be combined into one spawned instance or separated into two defined instances as illustrated herein. Instances 302 and 301 are spawned simultaneously and can be controlled by a time-out function. In another embodiment, instances 301 and 302 are not required because permanent client modules are in place to report the activity state and load states of each agent per each media type. In this case elements 301 and 302 are notification modules that simply request the most recent information.

A reporting engine 303 is provided and adapted to compile and report data gathered from spawned instances 301 and 302. In the case of a notification embodiment, reporting engine simply reports the most recent snapshot of the active agent data. Reporting engine 303 reports all of the pertinent information to a core processor 304, which applies the algorithm for determining a best match selection. After a determination has been made, which may include identification of a backup destination, processor 304 issues a command to a transaction routing function 305 to carry out the mechanics of routing assuming a set destination. Core processor 304 performs all of the mathematics and elimination to come up with a final recommended destination.

Algorithm

ACSR software uses algorithmic computations to produce a best match for routing according to an agent-capacity set determination. The entire processed is based partly on scalar load indications, but more importantly on skill considerations. As a predictive routine, ACSR availability determination accounts for a fact that a more experienced and skillful agent can deal with a higher number of interactions of varying media types simultaneously and a fact that a particular agent may be unusually or especially skillful in processing interactions of one or more specific media types.

Let M denote a set of particular media types that an agent must deal with simultaneously. The set can be expressed as media types $T_1$-$T_M$. With a set of media types defined as the included media types that are supported and that an agent or group of agents will work with, a few definitions need to be provided as follows:

An agent state can be defined as an integer vector $\vec{N} \in \Re^M$ of the form $N=(N_1, \ldots, N_M)$, where $N_i$ is equal to the number of particular interactions of the $i^{th}$ media type that is served by an agent simultaneously at any given moment of time. For each media type $T_S$, there are two defined linear operators. These are $IB_S: \Re^M \to \Re^M$ and $IE_S: \Re^M \to \Re^M$ further broken down as follows.

$$IB_S(\vec{N})=N^*=(N_1, \ldots, N_{S-1}, N_S+1, N_{S+1}, \ldots, N_M) \text{ and}$$

$$IE_S(\vec{N})=N^*=(N_1, \ldots, N_{S-1}, N_S+1, N_{S+1}, \ldots, N_M).$$

The operator IB maps an agent state N to the agent state N* that the agent goes to after being assigned a new interaction of the particular media type $T_S$. The operator IE maps an agent state N to the agent state N* that the agent goes to after completely serving an interaction of the media type $T_S$. Therefore, operators IB and IE are respectively referred to herein as start and end linear interaction operators in this example on the media type $T_S$. It will be obvious to one with skill in the art that $IB_S$ and $IE_S$ combined are equal to E where E is an identity operator.

Since agent capacity is limited, the state of all of the possible states pertaining to any specific agent is bounded as a set of M-vectors. This bounded set may be assumed convex. The simplest class of convex bounded sets are polytopes. This particular motivation leads to a next formal definition as follows. A capacity set of a particular agent is defined as a polytope $\Omega \subset \Re^M$ defined by a system of inequalities expressed as $B\vec{K} \leq \vec{C}$, where B is an L×M-matrix over the real numbers dim $\vec{C}$=L, dim $\vec{K}$=M such that current agent state $\vec{N} \in \Omega$ for every moment of time.

The graphic below illustrates the definitions described above for a case of M=2 (voice, e-mail).

Agent load is defined as a scalar product:

$$U(\vec{N}) = \langle \vec{N}, \vec{\omega} \rangle = \sum_{i=1}^{M} N_i w_i$$

where $\vec{N}$ is the current agent state and $\vec{\omega}$ is an M-vector of media weights. In a simplest case, $\vec{\omega}=\{1, \ldots, 1\}$.

Maximum permissible agent load is defined as follows:

$$U^* = \max_{\vec{K} \in \Omega_A} U(\vec{K})$$

It follows then from the four definitions given above that U* always exists. U* is equal to the maximum linear functional on a bounded polytope. The value can be found using the well-known simplex method.

Relative agent load is defined as follows:

$$\tilde{U}(\vec{N}) = \frac{U(N)}{U^*}.$$

Using the 6 definitions given above, the main algorithm automatically computes the best match for routing a particular interaction according to agent capacity set. A basic procedure consists of (a) constructing the available agents set using the formula $\Lambda: N^*_A = IB_S N_A \in \Omega_A$. (b) find the least relative loaded agent using the formula $$A^*: \tilde{U}(A^*) = \min_{A \in \Lambda} \tilde{U}$$

(A) and (c) routing the pending interaction to A*, which means that $\vec{N_{A^*}} \to IB_S \vec{N_{A^*}}$.

The very basic procedure stated above hold that the least relatively loaded agent is selected from the set of all available agents. However, more advanced or complex criteria can be applied in step (b) because the results in step (b) do not affect the outcomes of steps (a) or (c).

Additional criteria for selecting an agent may include aspects related to any scalar defined, or statistically predicted criteria. Although the steps described above are simple in definition it should be noted that a combined capacity set of all available agents comprises all of the individual agent capacity sets and can be generated as an indexed list of capacity sets showing all of the data of each set. The term least relatively loaded agent includes scalar considerations, skill considerations, and other additional considerations if the enterprise has adapted those considerations into the computation. Additionally, the steps described above may be integrated with other defined steps performed by other software processes such as CTI and TS routines.

The ACSR software of the present invention can be applied to all supported media types and pending events thereof without departing from the spirit and scope of the present invention. The method of the present invention can be practiced in a single contact center or in a network of physically separate contact centers wherein incoming events are pending agent-to-agent interactions.

In a further embodiment of the present invention, ACSR software may also be adapted to select a best match for incoming machine-based interactions, and other automated notifications that may not be customer-based. For example, automated system-maintenance requests generated on a periodic basis, say from an automated system repair scheduler that uses a voice application, can be considered as incoming events destined to a large group of system-maintenance professionals stationed within a contact center. The ACSR program can find the least relatively loaded system-maintenance professional who will most likely be able to handle a particular request in the most expedient fashion. There are many possible scenarios for ACSR application.

The methods and apparatus of the claimed invention, in light of the many possible embodiments, should be afforded the broadest possible scope under examination. The spirit and scope of the present invention should be limited only by the claims that follow.

What is claimed is:

1. A transaction router, comprising:
    a detection module for detecting the arrival of a transaction for routing;
    a mechanism for determining requirements for interacting with the received transaction, including hardware and software media capability and agent media skills; and
    an information gathering mechanism gathering information about specific potential destinations to route the received transaction to, including hardware and software media capability, agent media skills, and load status related to media type;
    wherein the router is hosted by a CTI processor, which computes values from the gathered information and uses an algorithm to determine a best match destination for an incoming event for routing, the algorithm producing a predictive result based on scalar load values per media type utilized simultaneously at a destination during a given period of time.

2. The transaction router of claim 1 wherein the destinations are associated with a pool of agents in a communication center, the agents assigned to and operating more than one type of multimedia application for interacting with incoming transactions.

3. The transaction router of claim 1 wherein the destinations are agent-operated multimedia workstations.

4. The transaction router of claim 1 wherein the incoming transactions for routing include telephone calls, e-mails, voice mails, file share requests, IP telephony calls, video conference calls, instant message sessions, and chat sessions.

5. The transaction router of claim 1 wherein the CTI-processor has connection to one or a combination of a telephony switch, a second CTI processor, and an IP router.

6. The transaction router of claim 1 wherein the information gathering mechanism is executed from at least one instance of a reporting module, the reporting module a distributed client of the application.

7. The transaction router of claim 6 where the number of the reporting module is equal to the number of considered destinations for routing, the modules distributed to the destinations and permanently resident therein.

8. The transaction router of claim 1 wherein load status includes one or more of queue load per media type per agent, server loads related to multimedia servers, port loads related to agent-operated communication ports, line loads related to network routing paths leading to agents, and system loads relating to number of applications running and memory-use of those applications on agent-operated systems.

9. A transaction routing method, comprising:
    (a) detecting arrival of a transaction for routing at a CTI processor hosting a router;
    (b) determining requirements for interacting with the received transaction, including hardware and software media capability and agent media skills; and
    (c) gathering information about specific potential destinations for the transaction, including hardware and software media capability, agent media skills, and load status related to media type; and
    (d) computing values from the gathered information and selecting a best destination for the received transaction using an algorithm producing a predictive result based on scalar load values per media type utilized simultaneously at a destination during a given period of time.

10. The method of claim 9 wherein the destinations are associated with a pool of agents in a communication center, the agents assigned to and operating more than one type of multimedia application for interacting with incoming events.

11. The method of claim 9 wherein the destinations are agent-operated multimedia workstations.

12. The method of claim 9 wherein incoming transactions for routing include one or more of telephone calls, e-mails, voice mails, file share requests, IP telephony calls, video conference calls, instant message sessions, and chat sessions.

13. The method of claim 9 wherein the CTI-processor has connection to one or a combination of a telephony switch, a second CTI processor, and an IP router.

14. The method of claim 9 wherein the information gathering mechanism is executed from at least one instance of a reporting module, the reporting module a distributed client of the application.

15. The method of claim 14 where the number of the reporting module is equal to the number of considered destinations for routing, the modules distributed to the destinations and permanently resident therein.

16. The method of claim 9 wherein load status includes one or more of queue load per media type per agent, server loads related to multimedia servers, port loads related to agent-operated communication ports, line loads related to network routing paths leading to agents, and system loads relating to number of applications running and memory-use of those applications on agent-operated systems.

* * * * *